United States Patent [19]
Sakaguchi

[11] Patent Number: 5,983,103
[45] Date of Patent: Nov. 9, 1999

[54] LOCATION REGISTRATION INHIBITION CONTROL APPARATUS FOR MOBILE RADIO TELEPHONE AND ITS METHOD THEREOF

[75] Inventor: Ikuo Sakaguchi, Tokyo, Japan

[73] Assignee: NEC Corporation, Tokyo, Japan

[21] Appl. No.: 08/625,309

[22] Filed: Apr. 1, 1996

[51] Int. Cl.⁶ .................................................. H04Q 7/20
[52] U.S. Cl. ........................................ 455/435; 455/456
[58] Field of Search .................... 455/435, 456, 455/411, 440, 515, 434

[56] References Cited

U.S. PATENT DOCUMENTS

| | | | |
|---|---|---|---|
| 5,379,451 | 1/1995 | Nakagoshi et al. | 455/435 |
| 5,581,804 | 12/1996 | Cameron et al. | 455/456 |

FOREIGN PATENT DOCUMENTS

| | | |
|---|---|---|
| 0 526 981 A2 | 2/1993 | European Pat. Off. . |
| 5130019 | 5/1993 | Japan . |
| WO 88/08238 | 10/1988 | WIPO . |
| WO 92/03878 | 3/1992 | WIPO . |
| WO 94/06219 | 3/1994 | WIPO . |

*Primary Examiner*—Dwayne D. Bost
*Assistant Examiner*—Myron K. Wyche
*Attorney, Agent, or Firm*—Sughrue, Mion, Zinn, Macpeak & Seas, PLLC

[57] ABSTRACT

The present invention makes a request for location registration inhibition at a key pad portion which is manipulated by an user of a mobile radio telephone. A first memory stores the inhibition request therein, and a display displays the inhibition request. A controller does not control (i.e., does not cause to be generated) a request for location registration with respect to the base station even though the user of the mobile radio telephone moves between registered location areas when the inhibition request is stored in the first memory.

10 Claims, 10 Drawing Sheets

LOCATION REGISTRATION INHIBITION CONTROL APPARATUS FOR MOBILE RADIO TELEPHONE AND ITS METHOD THEREOF

BACKGROUND OF THE INVENTION

The present invention relates to a mobile radio telephone, and more particularly to a location registration inhibition control apparatus for a mobile radio telephone and a control method thereof.

In the case where an user of a mobile radio telephone (hereinafter referred to as "telephone") moves over a location registration area consisting of a predetermined plural service zones, the telephone requests a base station to make location registration in order to reduce a period of time necessary for transmitting a signal from the base station to the telephone. Upon receiving a request for location registration from the telephone, the base station requests a control station to execute the location registration. The control station has a current location of the telephone stored in a location information storage station in response to a request from the base station.

In such location registration, when a telephone's user moves at a high speed by car or the like, the telephone is caused to frequently move between a plurality of service zones. As a result, the frequency of the location registration of the telephone is increased with such a problem that it gives a load to the control operation of the control station relating to the location registration.

In order to solve the above-mentioned problem, there has been known a location registration system disclosed in, for example, Japanese Patent Laid-Open Publication No. Hei 5-130019 published on May 25, 1993.

This location registering system is so designed that a telephone detects the signal quality of a received signal, and when the signal quality is deteriorated, it is judged that the telephone's user moves at a high speed. In the case where it is judged that the telephone moves at a high speed, for example, even though the telephone's user moves over a location registration area, the system inhibits a request for location registration from the telephone to a base station.

By the way, in the mobile radio telephone system used;. in Japan, a transmission dial number for calling a telephone is different between a short-range call and a long-range call. This is because the control station smoothly conducts accounting to a call side that calls a telephone (hereinafter referred to as "call side"). The call side, for example, dials 030 when making a short-range call equal to or less than 160 km, and dials 040 when making a long-range call greater than 160 km.

The control station calculates a distance between the call side and a called telephone on the basis of a location registration area in which the called telephone exists, and judges whether a call from the call side should be made by the long-range call or the short-range call. In the case where the call side calls with a dial "030" regardless of a fact that a call from the call side should be made by the long-range call, the control station announces a message "please redial with a dial "040"" to the call side. On the contrary, in the case where the call side calls with a dial "040" regardless of a fact that a call from the call side should be made by the short-range call, the control station announces a message "please redial with a dial "030"" to the call side.

Hence, in the case where the user moves to a location where a call cannot be made without a dial of 040 regardless of the fact that the user promises the call side in advance that he is at a location where a call can be made with a dial "030" which is the short-range call, the control station announces a message "please redial with a dial "040"" when the call side calls the telephone. This leads to such a drawback that the system informs the call side that the telephone's user has broken his promise with the call side.

In order to solve the drawback of this type, it is possible to turn off the power supply of the telephone. However, in this case, because the control station announces a message "the power supply of the telephone is off" to the call side, there is a possibility that the call side suspects that the telephone's user has broken his promise with the call side.

SUMMARY OF THE INVENTION

The present invention has been made in view of the above circumstances, and therefore an object of the present invention is to provide a location registration inhibition control apparatus for a mobile radio telephone (hereinafter, referred to as "telephone") and its method thereof, capable of preventing a call side from being informed of a current location of a telephone's user.

Another object of the present invention is to provide a control apparatus and its control method, which allows the telephone's user to arbitrarily select the inhibition or permission of location registration.

In order to achieve the above-mentioned objects, according to the present invention, there is provided a location registration inhibition control apparatus, which includes: a location registration inhibition request key that requests a location registration inhibition; and an inhibition circuit that inhibits location registration with respect to a base station even though the user moves from a location registration area while the location registration inhibition request key requests the location registration inhibition.

Also, according to the present invention, there is provided a location registration inhibition control method which includes the steps of: detecting that the user of the mobile radio telephone has moved from the registered location area; detecting that the inhibition of location registration is being requested; and inhibiting location registration.

With the above-mentioned arrangement, in the present invention, the telephone's user is capable of inhibiting a request for location registration and of preventing the call side from being informed of the current location of the telephone's user. Hence, in the case where there is a possibility that the telephone's user moves to a location where a call cannot be made by the long-range call regardless of the fact that the user promises the call side in advance that he is at a location where a call can be made by the short-range call, in order to prevent the call side from being informed that the user has broken his promise with the call side, the user operates the location registration inhibition circuit in advance so that he can make a request for location registration in the telephone.

Under the above circumstances, even though the telephone's user moves between an area in which a call must be made with a short-range call and an area in which a call must be made with a long-range call, a control station cannot determine a location at which the telephone actually exists because the telephone does not make a location registration with respect to the control station. Then, in this situation, the control station announces a message such as "Now, a called telephone is moving out of service area" even though the call side calls the telephone. The announcement of this type is made in the conventional telephone system when a call failure is caused by low radio signal. That is, this announcement is frequently made. Hence, the call side cannot judge whether the above announcement is caused by the call failure of the telephone or a request for location registration inhibition by the user, and does not decide that the user has broken his promise with the call side.

BRIEF DESCRIPTION OF THE DRAWINGS

These and other objects, features and advantages of the invention will become fully apparent from the following detailed description taken in conjunction with the accompanying drawings.

DETAILED DESCRIPTION OF THE PREFERRED EMBODIMENTS

Hereinafter, a description will be given in more detail of a mobile radio telephone, preferably a portable telephone (hereinafter, referred to as "telephone") in accordance with the present invention in conformity with "Digital system mobile telephone system standard: RCR STD-27B", with reference to the accompanying drawings.

Figure 1:
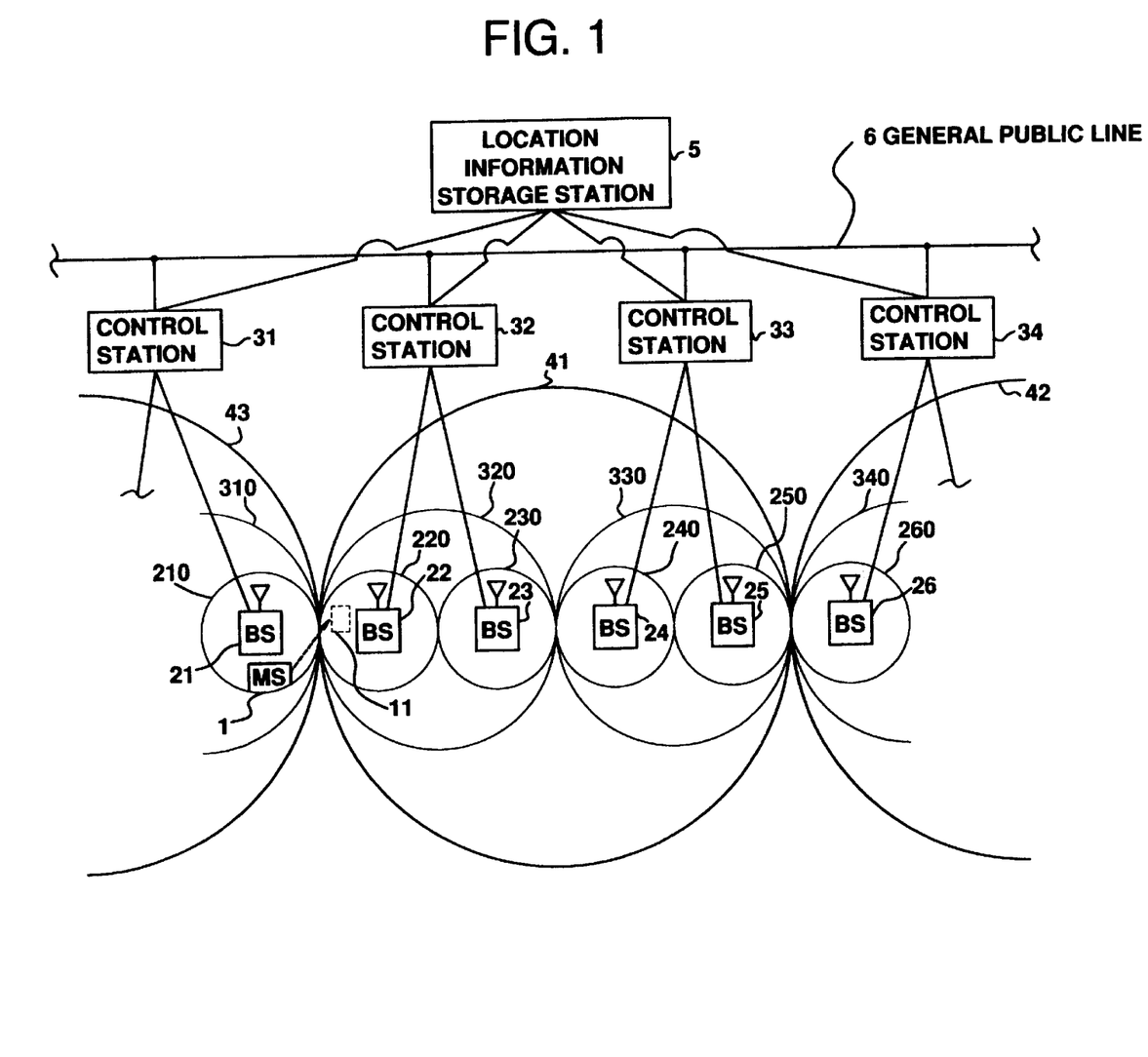
FIG. 1 is a systematic diagram showing one example of a mobile radio telephone system to which a mobile radio telephone in accordance with the present invention is applied.

In FIG. 1, a telephone 1 transmits and receives a radio signal with respect to base stations 21 to 26. The base stations 21 to 26 include home radio areas 210, 220, 230, 240, 250 and 260, respectively, so as to transmit and receive the radio signal with respect to the telephone 1 that exists in the home radio areas. It should be noted that the respective radio areas actually have cross-over portions, but for simplification of description, this embodiment will be described with the radio areas being not crossed. The respective base stations 21 to 26 transmit and receive a signal with respect to at least one of control stations 31 to 34 through wire lines. The control stations 31 to 34 transmit and receive a signal with respect to the base stations included in the respective home control areas 310, 320, 330 and 340 through wire lines, respectively. The control stations 31 to 34 allow the telephone 1 that has moved over registered location areas 41 to 43 to be stored in a location information storage station 5. The control stations 31 to 34 transmit and receive a signal with respect to a general public line 6 through wire lines.

Now, a description will be given of the location registration of the telephone 1.

In FIG. 1, the telephone 1 located in the radio area 210 in the control area 310 included in the location registration area 43 requests location registration with respect to the base station 21 when it moves to the radio area 220 in the control area 320 included in the location registration area 41 as indicated by reference numeral 11. In response to this request for location registration, the base station 21 transmits to the control station 31 a signal representing that the telephone 1 has moved to the radio area 220. In response to that signal, the control station 31 makes the location information storage station 5 store that the telephone 1 has moved to the radio area 220.

Figure 2:
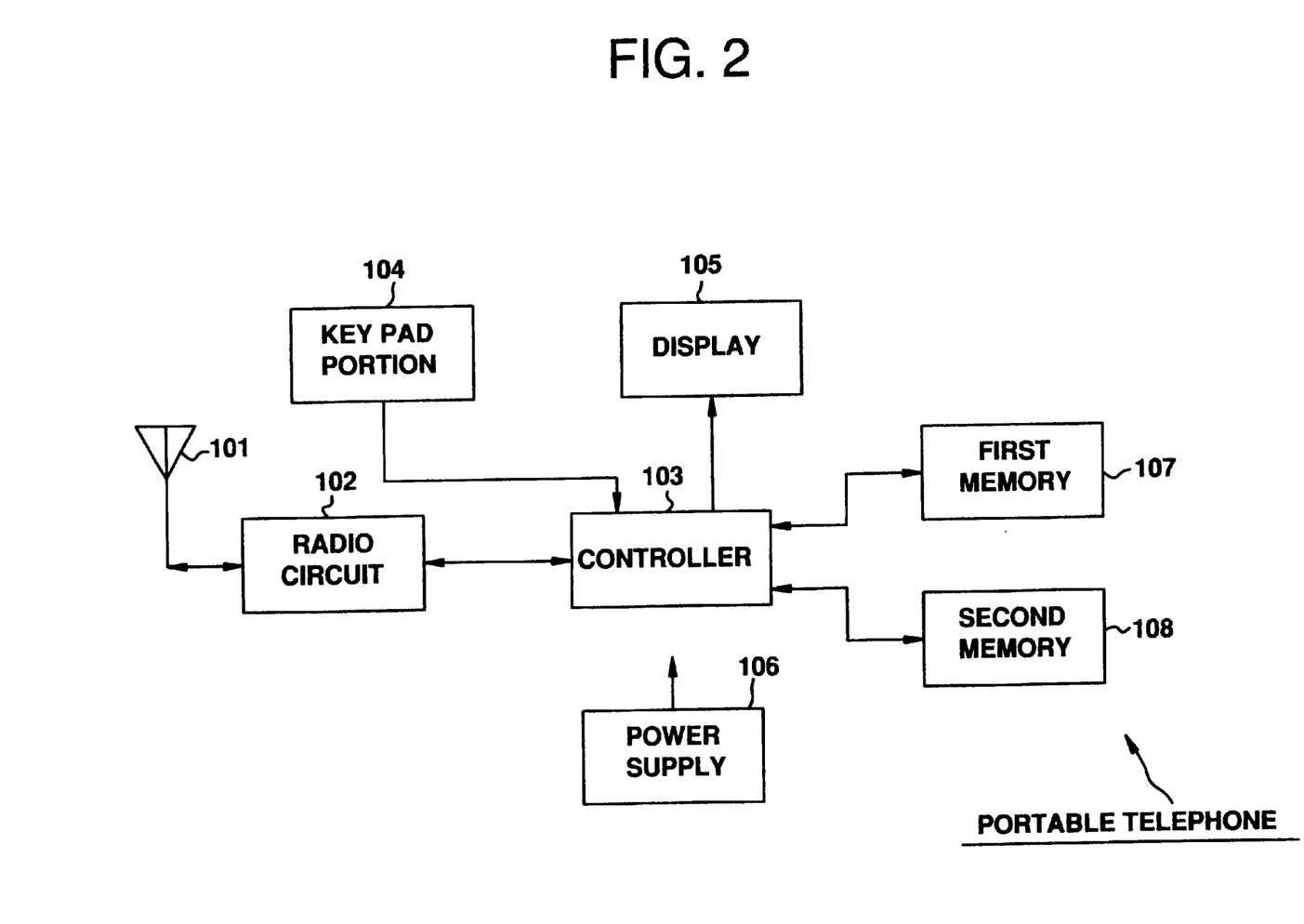
FIG. 2 is a block diagram showing the function of the mobile radio telephone in accordance with a preferred embodiment of the present invention.

In FIG. 2, an antenna 101 of the telephone 1 outputs a carrier of a down control channel from the base stations 21 to 26 to a radio circuit 102. The radio circuit 102 demodulates the carrier of the down control channel and outputs a demodulated signal to a controller 103. On the other hand, when transmitting a signal, the radio circuit 102 modulates a signal from the controller 103 and outputs a carrier of an up control channel to the antenna 101. The antenna 101 transmits the carrier of the up control channel from the radio circuit 102 to the base stations 21 to 26.

Figure 3:
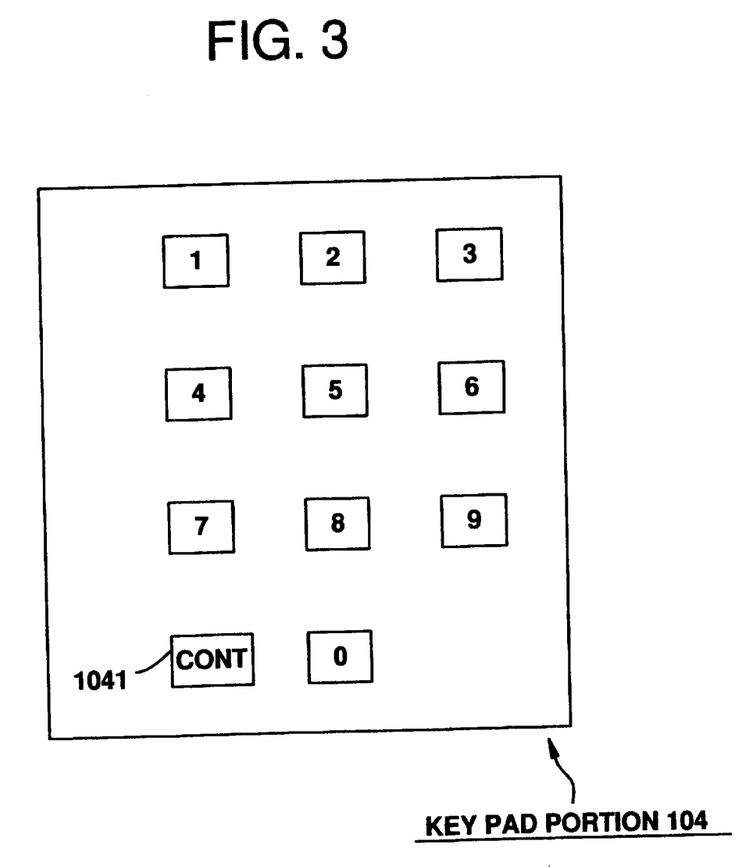
FIG. 3 is a front view showing a key pad portion shown in FIG. 2.

The key pad portion 104, for example, as shown in FIG. 3, includes ten keys of 0 to 9 and a control key (CONT key) 1041, and is manipulated by an user of the telephone 1. In inhibiting a request for location registration with respect to the location information storage station 5, the user manipulates the ten keys and inputs a predetermined location registration inhibition number. In transferring from the inhibition of a request for location registration to a permission thereof, the user manipulates the ten keys and inputs a predetermined location registration permission number. The control key 1041 may be used as an exclusive push button for inputting the inhibition and permission of a request for location registration.

A first memory 107, when the location registration inhibition number is inputted in the key pad portion 104, stores a location registration inhibition code. In the case where the first memory 107 has stored the location registration inhibition code, if the location registration permission number is dialed in the key pad portion 104, the first memory 107 erases the storage of the location registration inhibition code. A second memory 108 stores an area code of the registered location area where the telephone is located at present.

A display 105, when the first memory 107 stores the location registration inhibition code, displays the characters of "location registration inhibition". The display 105 may display a predetermined mark instead of the characters of "location registration inhibition".

A power supply 106 is on/off-controlled by the user. When the power supply 106 is on, it supplies electric power to the radio circuit 102, the controller 103, the display 105, the first memory 107 and the second memory 108. The power supply 106 supplies electric power to the radio circuit 102 on the basis of the intermittent receive operation.

The controller 103 comprises, for example, two CPUs, that is, μPD93138GJ made by NEC and μPD78P054GK made by NEC. The controller 103 sets the reception frequency of the radio section 102 on the basis of the electric field strength of the carrier in the control channel which has been received. The controller 103 allows the area code of the registered location area containing therein the base station that transmits the carrier of the set down control channel to be stored in the second memory 108. The controller 103 makes the radio circuit 102 conduct the intermittent receive operation. The controller 103 controls a request for location registration with respect to the location information storage station 5 when the electric field strength of the received carrier of the control channel becomes a predetermined level or less and the first memory 107 does not store the location registration inhibition code therein.

Figure 4:
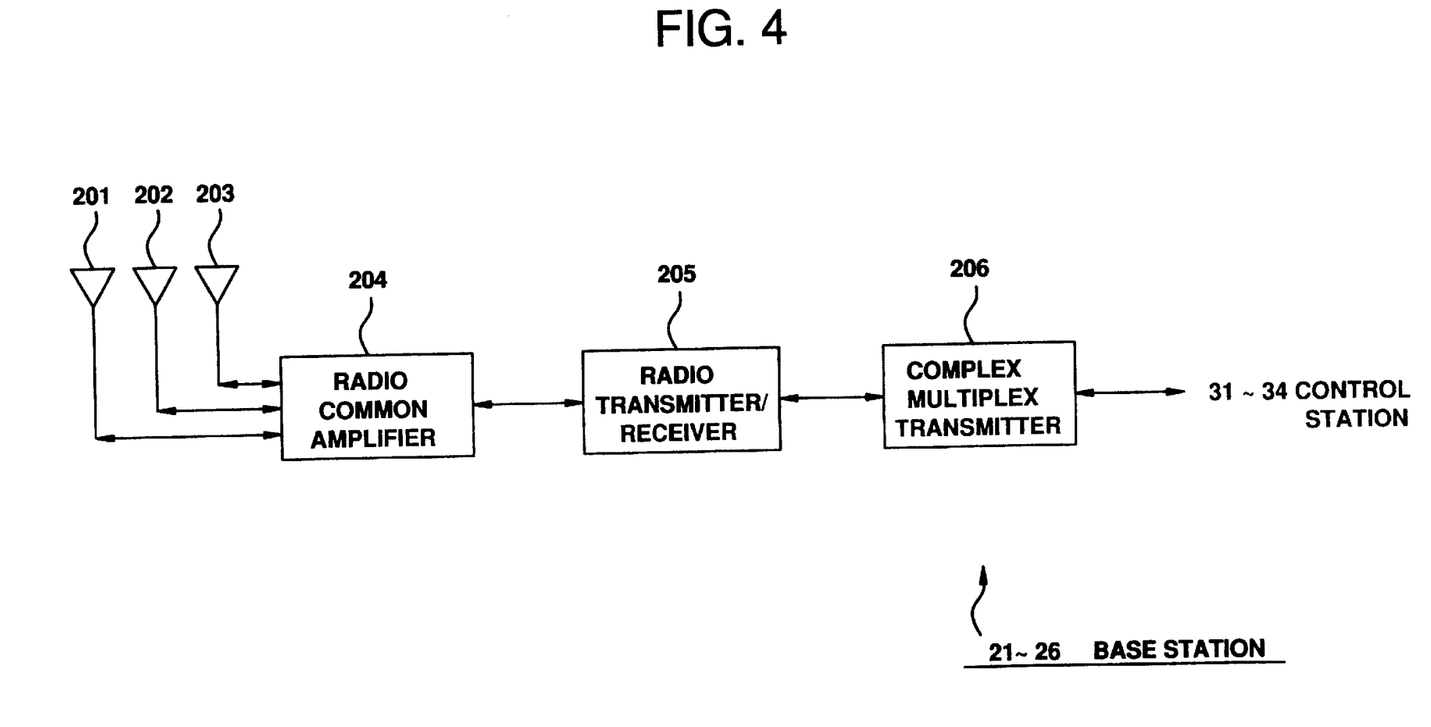
FIG. 4 is a block diagram showing an example of the function of a base station which is radio-connected to the mobile radio telephone of the present invention.

In FIG. 4, the base stations 21 to 26 include antennas 201 to 203, a radio common amplifier 204, a radio transmitter/receiver 205 and a complex multiplex transmitter 206, respectively.

Subsequently, a description will be given of the operation of the base stations 21 to 26.

The antennas 201 to 203 of the base stations 21 to 26 receive a radio signal from the telephone 1 in the diversity reception manner. The received signal from the antenna 201, 202 or 203 is amplified by the radio common amplifier 204 and then outputted to the radio transmitter/receiver 205. A signal from the radio common amplifier 204 is demodulated by the radio transmitter/receiver 205 into a demodulated signal to be outputted to the complex multiplex transmitter 206. The demodulated signal from the radio transmitter/receiver 205 is multiplexed and separated by the complex multiplex transmitter 206 and then outputted to the control stations 31 to 34.

On the other hand, when transmitting a signal, a signal from the control stations 31 to 34 is multiplexed by the complex multiplex transmitter 206 and then outputted to the radio transmitter/receiver 205. A signal from the complex multiplex transmitter 206 is modulated by the radio transmitter/receiver 205 into a modulated signal to be outputted to the radio common amplifier 204. The modulated signal from the radio transmitter/receiver 205 is amplified by the radio common amplifier 204 into a transmission signal to be outputted to the telephone 1 through the antenna 201, 202 or 203.

Subsequently, a description will be given of the down control channel with reference to FIGS. 5(*a*), 5(*b*), 6(*a*) and 6(*b*).

Figure 5A:
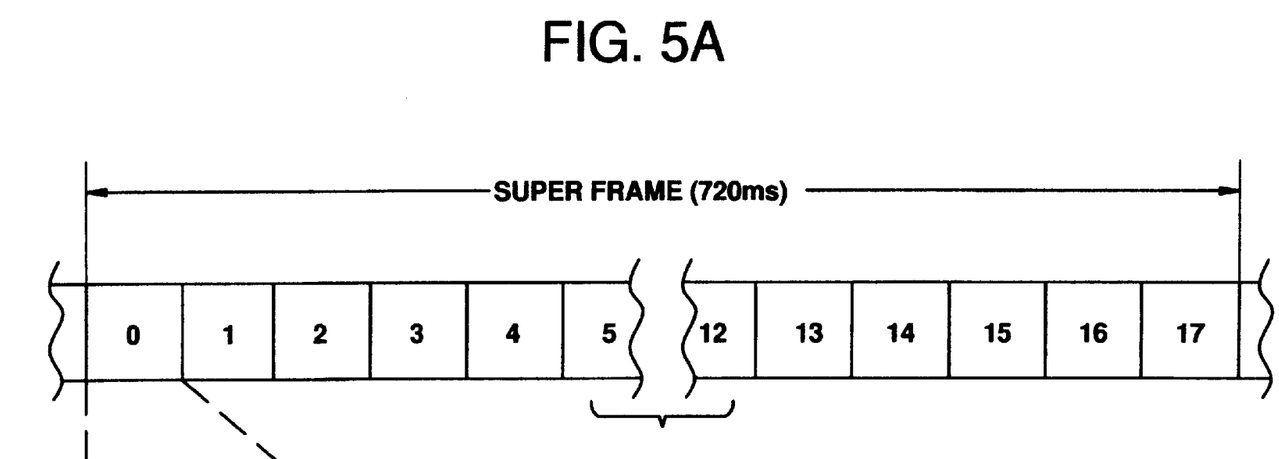
FIGS. 5(a) and 5(b) are diagrams showing the signal structure for explaining an example of the slot structure in a carrier of a down control channel which is received by the mobile radio telephone of the present invention, respectively.

In FIG. 5(*a*), a super frame is comprised of frames 0 to 17 and has a length of 720 ms.

Figure 5B:
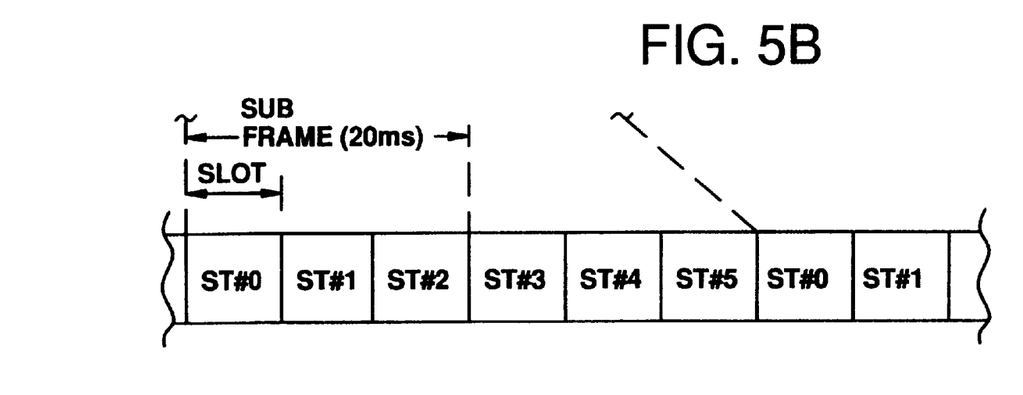

In FIG. 5(*b*), in the slot structure of a half rate, each frame is comprised of slots ST# 0 to 5. The slots ST# 0 to 2 or the slots ST# 3 to 5 constitute a sub frame each having a length of 20 ms.

Figure 6A:
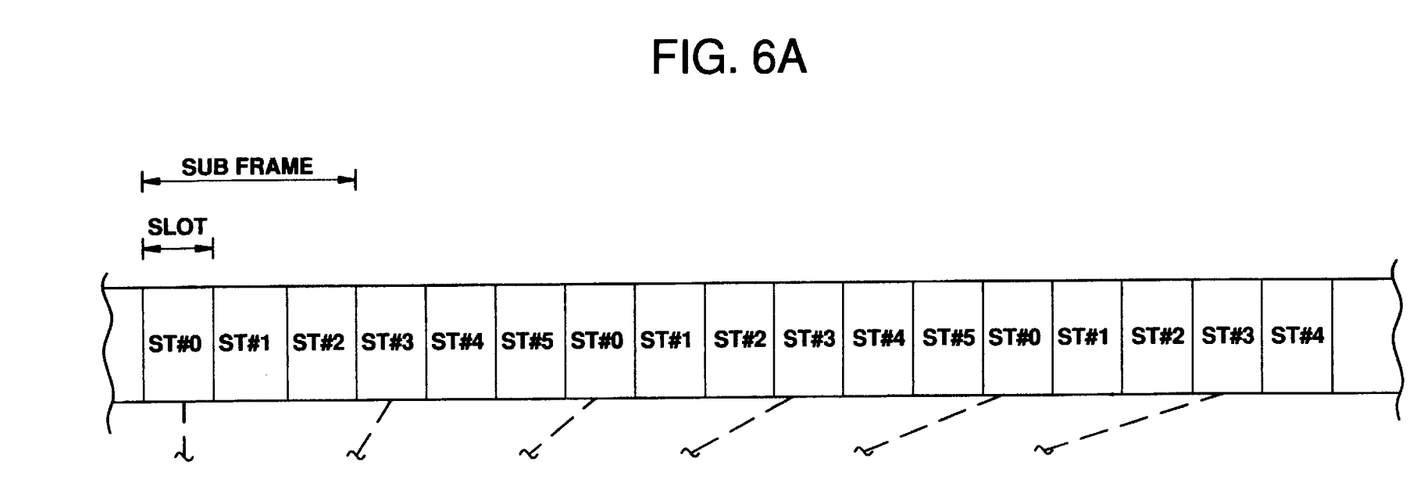
FIGS. 6(a) and 6(b) are diagrams showing the signal structure for explaining an example of the structure in which a physical channel is assigned to the slot structure in the carrier shown in FIGS. 5(a) and 5(b), respectively.
Figure 6B:
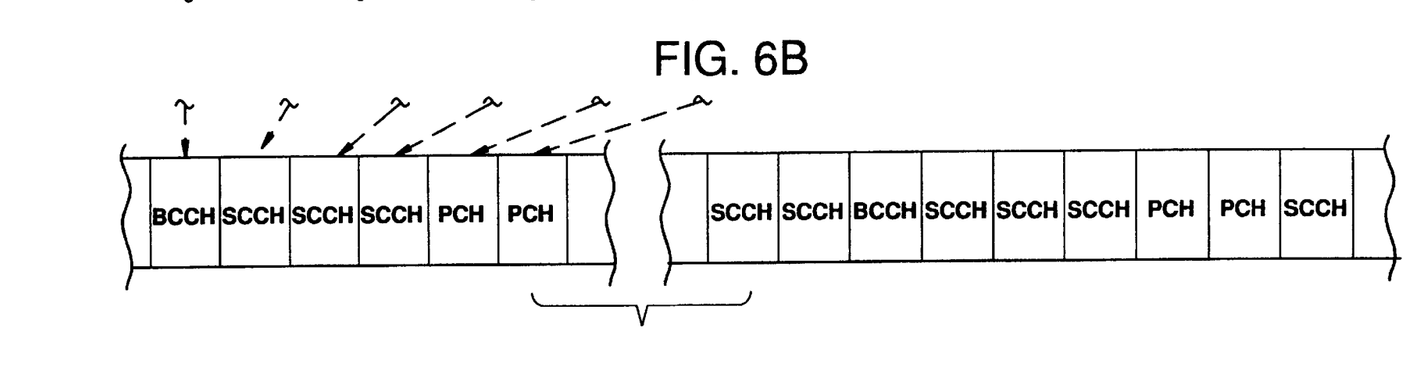

In FIGS. 6(*a*) and 6(*b*), to ST#0 or ST#3 constituting a leading slot of the sub frame, any one of BCCH, an exclusive individual cell signalling channel (SCCH), and PCH is assigned, respectively.

BCCH includes information of PCH, a predetermined level for judgement whether location registration should be conducted, and an area code of the location registration area in which the base station that transmits a signal of a control channel which is now received is contained. SCCH is also assigned to the up and down control channel, and used when making a call connection to the base station. PCH is a contains therein the telephone number of a telephone when receiving a call.

Then, a description will be given of the operation of the telephone since the power supply is turned on under control until the radio circuit 102 starts the intermittent reception, with reference to FIGS. 7(*a*), 7(*b*) and 8.

In FIG. 3, when the power supply is turned on under control (Step S1), the controller 103 makes the radio circuit 102 turn on in response thereto (Step S2). After turning on, the radio circuit 102 starts to scan a plurality of predetermined reception frequencies in order to set the frequency of the carrier in the down control channel to be received (Step S3). After the radio circuit 102 has finished scanning all the plural predetermined reception frequencies (Step S4), the controller 103 sets the reception frequency of the radio circuit 102 to the frequency of the control channel signal from which the strongest electric field strength has been detected, on the basis of the electric field strength of the channel signal of each reception frequency which could be obtained by that scanning operation (Step S5).

The radio circuit 102 starts to receive the carrier of the down control channel at a set reception frequency and receives BCCH contained in a predetermined slot (Step S6).

Figure 7A:
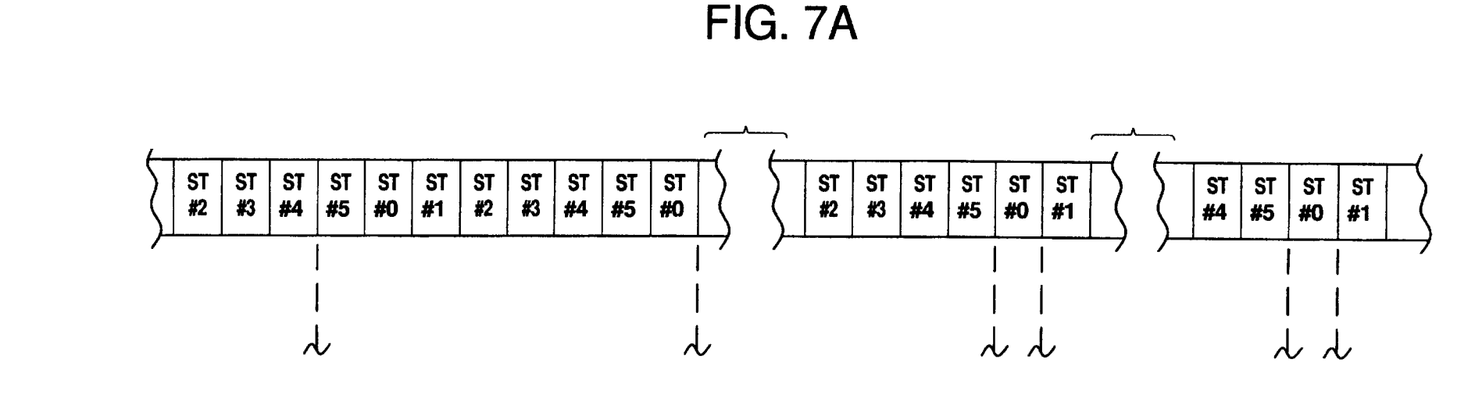
FIGS. 7(a) and 7(b) are timing charts for explaining an example of the intermittent receive operation of a radio circuit shown in FIG. 2.
Figure 7B:
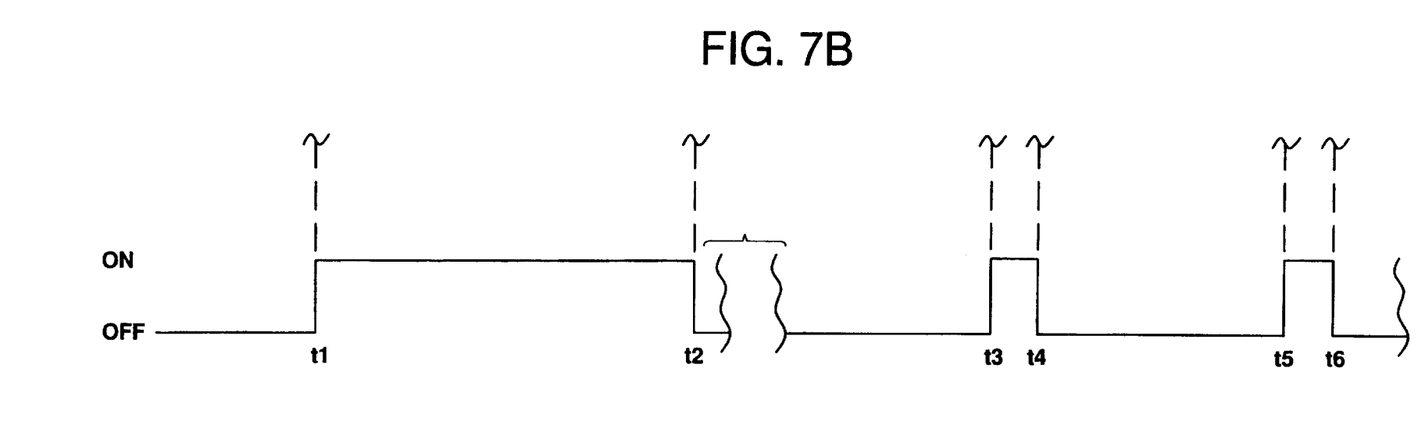
Figure 8:
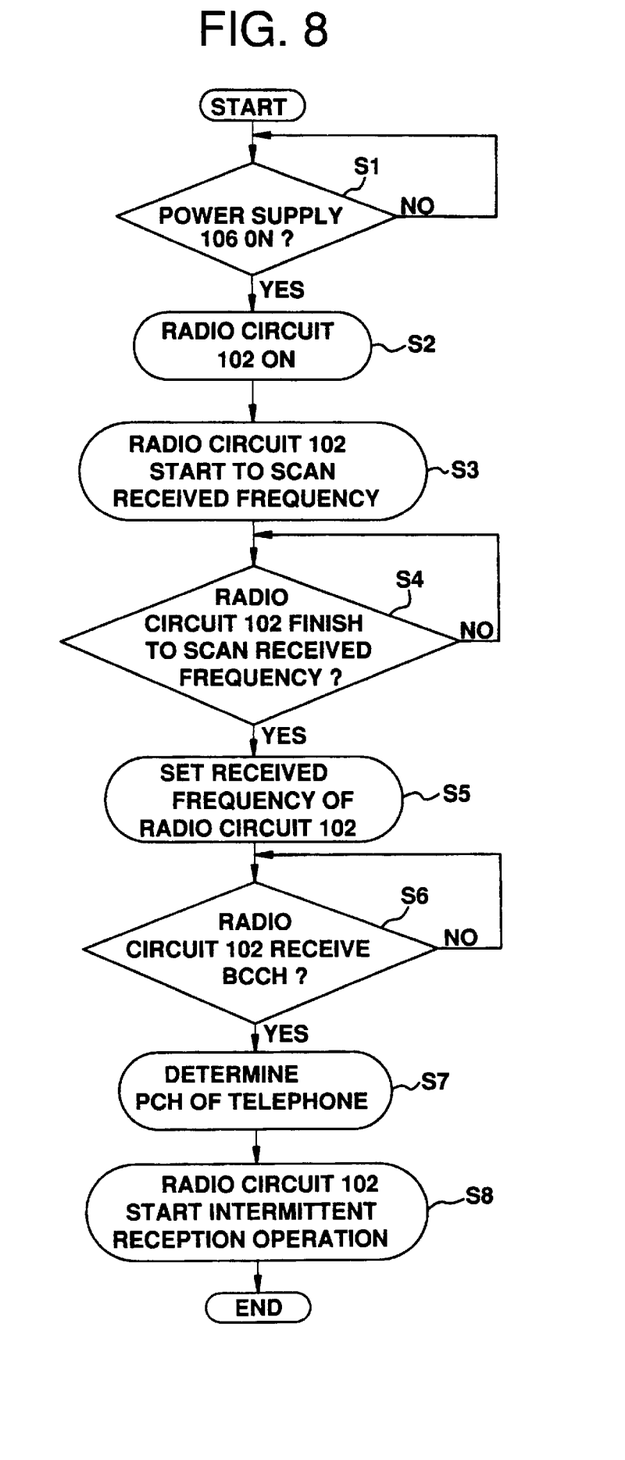
FIG. 8 is a flowchart for explaining the operation of the mobile radio telephone at the time of the intermittent receive operation shown in FIGS. 7(a) and 7(b)

In this situation, in FIGS. 7(*a*) and 7(*b*), after the reception frequency of the radio circuit 102 is set, the radio circuit 102 receives the slot ST#5 at a time t1. The radio circuit 102 continues to be on until it receives a predetermined slot to which BCCH is assigned, and receives BCCH at a time t2 first after power supply turns on in the slot ST#0.

Returning again to FIG. 8, when the radio circuit 102 has received BCCH (Step S6), the controller 103 detects from the demodulated signal of BCCH the area code of the location registration area in which the base station which is transmitting the control channel signal having the frequency which is now received is contained. Then, the controller 103 makes the second memory 108 store the area code therein, and determines PCH of the telephone from the demodulated signal (Step S7). After the determination of PCH of the telephone, the radio circuit 102 starts to make intermittent reception so as to receive only slots to which BCCH or PCH is assigned in advance (Step S8).

This operation will be described with reference to FIGS. 7(*a*) and 7(*b*).

The radio circuit 102 determines PCH of the telephone upon receiving BCCH at the time t2. Then, the radio circuit 102 is turned off until a time t3 where it receives the slot ST#0 to which PCH of the telephone is assigned. Upon receiving PCH at the time t3, the radio circuit 102 is again turned off at a time t4 and held off until a time t5 where it receives the slot ST#0 to which BCCH is assigned. Upon receiving BCCH at the time t5, the radio circuit 102 is again turned off at a time t6. Thereafter, the same intermittent reception operation is repeated.

Then, a location registration method will be described with reference to FIG. 9.

Figure 9A:
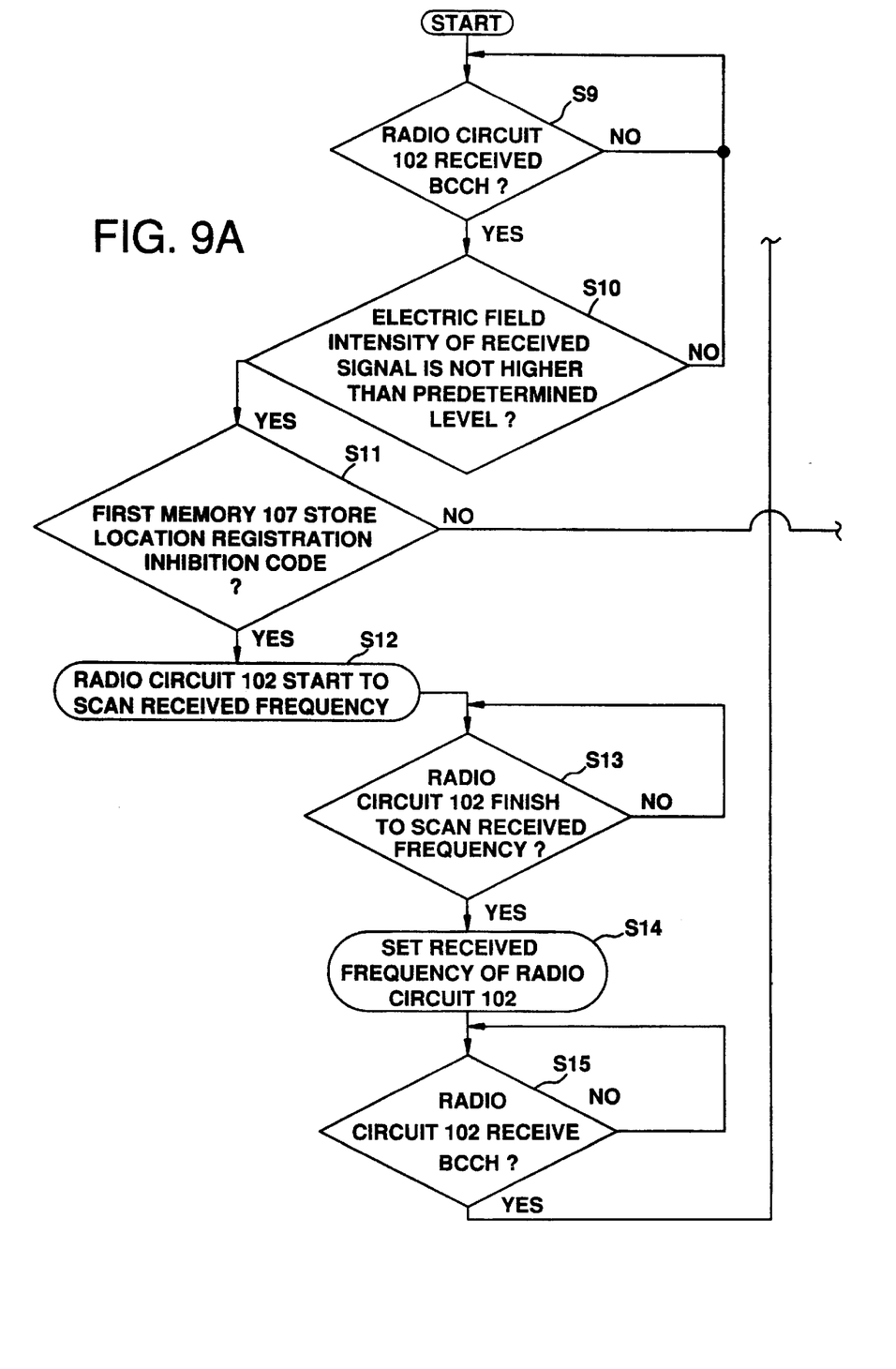
FIG. 9 is a flowchart for explaining a location registration control method of the mobile radio telephone shown in FIG. 2.
Figure 9B:
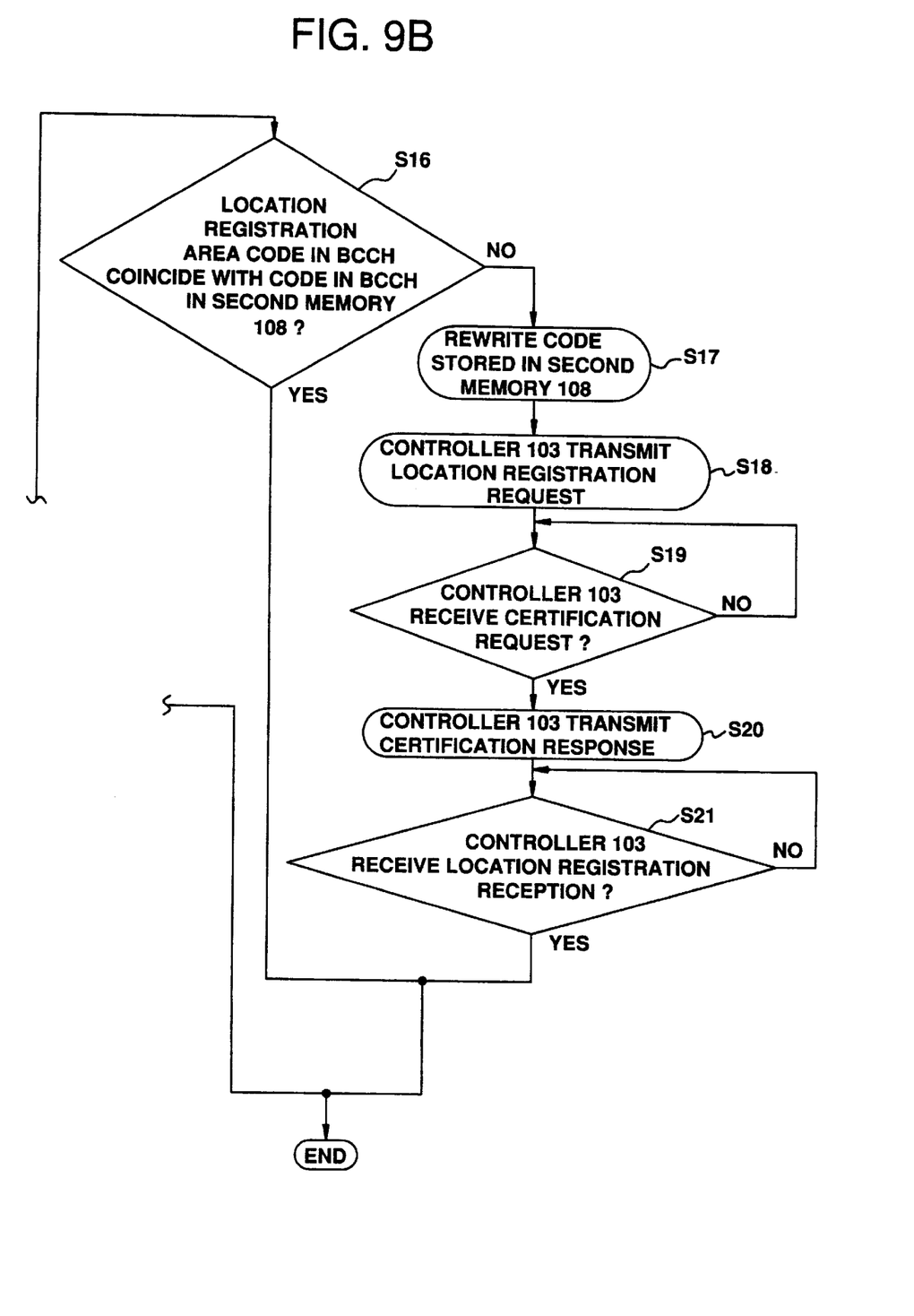

In FIG. 9, when the radio circuit 102 receives BCCH during the intermittent reception operation (Step S9), the controller 103 detects the electric field strength of the received control channel signal and reads the predetermined level from the demodulated signal of BCCH so that it judges whether the detected electric field strength is not higher than the predetermined level or not (Step S10). If the electric field strength is higher than the predetermined level, the radio circuit 102 conducts the intermittent reception operation similarly to the prior operation and returns to Step S9 in order to receive BCCH which will be sent succeedingly.

On the other hand, if the electric field strength is not higher than the predetermined level, the controller 103 judges whether the location registration inhibition code has been stored in the first memory 107 or not (Step S11). In the case where the location registration inhibition code has been stored in the first memory 107, the controller 103 does not control a request for location registration from the telephone to the base station.

On the other hand, in the case where the location registration inhibition code has not been stored in the first memory 107, the radio circuit 102 starts to scan a plurality of predetermined reception frequencies (Step S12). After the radio circuit 102 has finished scanning all the plurality of predetermined reception frequencies (Step S13), the controller 103 sets the reception frequency of the radio circuit 102 to the frequency of the control channel signal from which the strongest electric field strength has been detected, on the basis of the electric-field strength of the carrier of the control channel of each reception frequency which could be obtained by that scanning operation (Step S14).

The radio circuit 102 starts to receive the carrier of the down control channel at a set reception frequency and receives BCCH contained in a predetermined slot (Step S15). The controller 103 detects from the demodulated signal of the received BCCH the area code of the location registration area in which the base station which is transmitting the carrier of the control channel having the frequency which is now received is contained. Then, the radio circuit 102 compares the detected area code of the location registration area with the area code of the location registration area that contains therein the base station which is transmitting the carrier of the control channel having the frequency which has been stored in the second memory 108 and received until now (Step S16). As a result of that comparison, when the former is identical to the latter, the controller 103 does not control a request for location registration from the telephone to the base station.

On the other hand, when the former is not identical to the latter, the controller 103 rewrites the area code stored in the second memory 108 into the area code detected at present (Step S17) and transmits the location registration request to the base station (Step S18). When the controller 103 receives a request for certification transmitted from the base station through the radio circuit 102 in response to that request (Step S19), it transmits a certification response (Step 820). The controller 103 receives a location registration reception which is transmitted from the base station in response to that request through the radio circuit 102 (Step S21), to thereby complete the control of a request for location registration from the telephone to the base station.

As described above, the present invention can inhibit a request of the location registration from the telephone by the user. Hence, in the case where there is a possibility that the telephone's user moves to an area of the long-range call regardless of the fact that the user promises the call side in advance that he is at a location where a call can be made by the short-range call, in order to prevent the call side from being informed that the user has broken his promise with the call side, the user inhibits a request for location registration before moving to the area of the long-range call.

Under the above circumstances, when the user moves to the area of the long-range call, the control station cannot grasp a location at which the telephone exists because the telephone does not make a location registration, and cannot make the location information storage station 5 store the current location of the mobile station therein. Then, in this situation, when the call side calls the telephone, then the control station announces a message "Now, the called telephone is out of service area".

The announce of this type is made in the conventional telephone when a call failure is caused. That is, this announce is frequently made. Hence, the call side cannot judge whether the above announce is caused by the fact that the telephone inhibits the location registration or the call failure of the telephone, and the call side cannot decide as the telephone's user has broken his promise with the call side.

In this embodiment, after the controller 103 judges whether the electric field strength of the carrier of the control channel having the reception frequency is not higher than the predetermined level or not (Step S10 in FIG. 9), the controller 103 judges whether the location registration inhibition code has been stored in the first memory 107 or not (Step S11 in FIG. 9), to thereby judge the inhibition or permission of the location registration. However, the judgement of the inhibition of location registration is not limited to or by the steps subsequent to that step S10, and any step may be conducted if the judgement is made before the controller 103 transmits a request for location registration (Step S18 in FIG. 9).

Subsequently, a description will be given of another embodiment of the present invention.

In this embodiment, the first memory 107 is comprised of a memory whose storage is not erased even though the power supply 106 is turned off. The controller 103 does not control a request for location registration from the telephone to the base station if the location registration inhibition code has been stored in the first memory 107 when the power supply is turned on under control.

With the above-mentioned structure, even though the telephone's user moves to a location where a call cannot be made without a dial "040", and turns off the power supply 106 under control, and thereafter turns on the power supply 106 under control, the location of the telephone is not grasped by the control station because a request for location registration is inhibited.

In this embodiment, RCR STD-27B was described as one example of the telephone standard, however, the present invention is not limited to or by the standard of this type.

Also, the above-mentioned embodiments were described using a portable telephone, however, the present invention is similarly applicable to the automobile telephone or the like.

As was described above, according to the present invention, because the key pad portion 104 is so structured as to request the inhibition of location registration from the telephone, the telephone's user can select the inhibition or permission of location registration.

Hence, in the case where there is a possibility that the telephone's user moves to an area of the long-range call regardless of the fact that the user promises the call side in advance that he is in an area of the short-range call, the telephone's user can inhibit location registration.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A location registration inhibition control apparatus for a mobile radio telephone comprising:

request means for a user to request a location registration inhibition; and inhibition means for inhibiting, in response to said user requesting said location registration inhibition, a location registration with respect to a base station, even when said mobile radio telephone moves between registered location areas.

2. The apparatus, as claimed in claim 1, wherein said inhibition means comprises:

release request means for requesting a release of said location registration inhibition when said location registration is inhibited; and location registration means for executing said location registration with respect to said base station if said mobile radio telephone moves between said registered location areas when said release request means requests said release of said location registration inhibition.

3. A location registration inhibition control apparatus for a mobile radio telephone comprising:

request means for requesting a location registration inhibition; and inhibition means for inhibiting a location registration with respect to a base station, even when said mobile radio telephone moves between registered location areas when said request means requests said location registration inhibition, wherein said request means comprises ten keys for telephone number, and said location registration inhibition is requested by inputting a predetermined telephone number.

4. A location registration inhibition control apparatus for a mobile radio telephone comprising:

request means for requesting a location registration inhibition; and inhibition means for inhibiting a location registration with respect to a base station, even when said mobile radio telephone moves between registered location areas when said request means requests said location registration inhibition, wherein said request means comprises a predetermined key pad, and said location registration inhibition is requested by manipulating said key pad.

5. The apparatus, as claimed in claim 1, further comprising display means for displaying a mark representative of said location registration inhibition when said location registration is inhibited by said inhibition means.

6. A location registration inhibition control apparatus for a mobile radio telephone comprising:

an antenna for receiving a down control signal from a base station to output a received signal, and for inputting a transmission signal to transmit an up control signal to said base station;

a radio circuit for demodulating said received signal to output a demodulated signal, and for modulating a signal to be modulated to output said transmission signal;

a key pad section which is manipulated by an user of said mobile radio telephone and requests a location registration inhibition;

a first memory for storing an area code of a registered location area of said base station where said mobile radio telephone present exists;

a second memory for storing a location registration inhibition code according to a request for said location registration inhibition;

a controller that controls said location registration inhibition of with respect to said base station even though said user of said mobile radio telephone moves from said location registration area when said second memory stores said location registration inhibition code therein;

a display for displaying a mark representative of said location registration inhibition when said second memory stores said location registration inhibition code therein; and a power supply for supplying an electric power to said radio circuit said display, said first and second memory and said controller.

7. A method of controlling a location registration inhibition for a mobile radio telephone, the method comprising the steps of:

detecting that said mobile radio telephone moves from a registered location area;

detecting a request, from a user of said mobile radio telephone, for inhibition of location registration; and inhibiting said location registration.

8. The method, as claimed in claim 7, wherein said step of detecting said mobile radio telephone comprises the steps of:

detecting an electric field strength of said radio signal; and judging whether said electric field strength detected is greater than a predetermined electric field strength.

9. The method, as claimed in claim 7, wherein said step of detecting said mobile radio telephone comprises the step of detecting a predetermined electric field strength from said radio signal.

10. A method of controlling a location registration inhibition for a mobile radio telephone, comprising the steps of:

judging whether a signal electric field strength of a received frequency is not higher than a predetermined level, or not, when receiving BCCH;

judging whether a inhibition of a location registration is requested, or not, when said electric field strength is not higher than said predetermined level;

scanning said received frequency when said inhibition of said location registration is not requested;

setting said received frequency to a frequency having a strongest electric field strength, said frequency having said strongest electric field strength defining a set frequency;

receiving said BCCH by said set frequency;

judging whether a location registration area code contained in said BCCH is identical to said location registration area code which has been received before scanning said received frequency;

transmitting said a location registration request when said location registration area code contained in said BCCH is not identical to said location registration area code which has been received before scanning said received frequency in said identical judgement;

receiving a request for certification from a base station;

transmitting a certification response in response to said request for certification; and receiving a location registration reception from said base station.

* * * * *

UNITED STATES PATENT AND TRADEMARK OFFICE
CERTIFICATE OF CORRECTION

PATENT NO. : 5,983,103
DATED : November 9, 1999
INVENTOR(S) : Ikuo SAKAGUCHI

It is certified that error appears in the above-identified patent and that said Letters Patent is hereby corrected as shown below:

Item No. [30], Foreign Application Priority Data, was omitted from the patent, please insert:

--Mar. 31, 1995    [JP]   Japan...................7-075-767.

Signed and Sealed this

Fourteenth Day of November, 2000

Attest:

Q. TODD DICKINSON

Attesting Officer

Director of Patents and Trademarks